(12) United States Patent
Kuriyama

(10) Patent No.: US 8,654,203 B2
(45) Date of Patent: Feb. 18, 2014

(54) IMAGING DEVICE CONTROLLING OPERATION OF A ZOOM LENS AND A FOCUS LENS TO CREATE MOVIE IMAGE DATA

(75) Inventor: Takashi Kuriyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 472 days.

(21) Appl. No.: 12/896,112

(22) Filed: Oct. 1, 2010

(65) Prior Publication Data

US 2011/0134284 A1   Jun. 9, 2011

(30) Foreign Application Priority Data

Oct. 13, 2009   (JP) ................................. 2009-236518

(51) Int. Cl.
*H04N 5/225* (2006.01)
*G03B 13/00* (2006.01)

(52) U.S. Cl.
USPC ................... 348/220.1; 348/333.02; 348/347

(58) Field of Classification Search
USPC .................................................... 348/220.1
See application file for complete search history.

(56) References Cited

U.S. PATENT DOCUMENTS

| | | | |
|---|---|---|---|
| 8,525,894 B2 * | 9/2013 | Kunishige et al. ......... | 348/220.1 |
| 2002/0080242 A1 | 6/2002 | Takahashi et al. | |
| 2002/0080257 A1 * | 6/2002 | Blank .......................... | 348/345 |
| 2002/0191100 A1 * | 12/2002 | Matsunaga et al. ........... | 348/345 |
| 2005/0157180 A1 | 7/2005 | Takahashi et al. | |
| 2009/0244359 A1 * | 10/2009 | Ohta ............................. | 348/354 |
| 2009/0295948 A1 * | 12/2009 | Oishi ............................ | 348/239 |
| 2012/0133822 A1 * | 5/2012 | Kawai .......................... | 348/347 |
| 2012/0219264 A1 * | 8/2012 | Kuriyama ..................... | 386/230 |

FOREIGN PATENT DOCUMENTS

| | | |
|---|---|---|
| JP | A-02-004088 | 1/1990 |
| JP | A-2-46414 | 2/1990 |
| JP | A-2-135429 | 5/1990 |

(Continued)

OTHER PUBLICATIONS

Jan. 24, 2012 Office Action issued in Japanese Patent Application No. 2009-236518 (with English translation).

*Primary Examiner* — Ngoc-Yen Vu
(74) *Attorney, Agent, or Firm* — Oliff PLC

(57) ABSTRACT

Provided are: an imaging sensor that captures subject light via a photographic optical system provided with a zoom lens and a focus lens; a display unit that displays a through image based upon an imaging signal from the imaging sensor; a predetermined area setting unit that sets a predetermined area on the through image displayed on a display surface of the display unit in a state which is set to a first angle of view or a second angle of view different from the first angle of view by driving the zoom lens; a movement control unit that moves positions of the zoom lens and the focus lens by controlling drive of the zoom lens and the focus lens, so as to change from a first state, which is set to the first angle of view and serves as an in-focus state focused on the predetermined area set by the predetermined area setting unit to a second state, which is set to the second angle of view and serves as an out-of-focus state defocused on the predetermined area, or from the second state to the first state over a predetermined time; and a movie image data creation unit that creates movie image data, which includes a movie image changed from the first state to the second state by the movement control unit over the predetermined time, based upon the imaging signal from the imaging sensor.

9 Claims, 12 Drawing Sheets

(56) References Cited

FOREIGN PATENT DOCUMENTS

| | | |
|---|---|---|
| JP | A-07-193740 | 7/1995 |
| JP | A-2001-159730 | 6/2001 |
| JP | A-2002-027305 | 1/2002 |
| JP | A-2007-295529 | 11/2007 |
| JP | A-2008-135937 | 6/2008 |
| JP | A-2008-187364 | 8/2008 |
| JP | A-2009-89144 | 4/2009 |

* cited by examiner

IMAGING DEVICE CONTROLLING OPERATION OF A ZOOM LENS AND A FOCUS LENS TO CREATE MOVIE IMAGE DATA

CROSS-REFERENCE TO RELATED APPLICATIONS

The disclosure of the following priority application is incorporated herein by reference:

Japanese Patent Application No. 2009-236518 filed on Oct. 13, 2009

TECHNICAL FIELD

The present invention relates to an imaging device capable of recording a movie image.

BACKGROUND ART

There has been proposed a camera that automatically decides a shooting magnification from the distance to a subject, calculates a drive amount of a variable power lens from a focal distance corresponding to the decided shooting magnification, and drives the variable power lens during video recording based upon the calculation result (for example, see Patent Literature 1). Furthermore, there has been proposed a camera capable of shooting a still image with a special shooting effect caused by zooming during exposure by automatically moving a zoom lens during exposure (for example, see Patent Literature 2).

CITATION LIST

Patent Literature

Patent Literature 1: Japanese Patent Laid-open Application Publication No. H02-135429
Patent Literature 2: Japanese Patent Laid-open Application Publication No. H02-46414

SUMMARY OF INVENTION

Technical Problem

However, the above-described patent documents 1 and 2 do not discuss a technology for shooting a movie image in which a focus state and a zoom state are continuously changed by automatically moving a focus lens and a zoom lens.

In the case of shooting a movie image, there is an increased demand for a technology capable of easily acquiring a movie image with an impressive video effect such as a movie image gradually changing from a zoomed-in out-of-focus state to a state focused on a target subject while zooming-out by combining a zoom effect with a focusing effect. However, when a user shoots the above-described movie image with the impressive video effect by manually operating a video camera and the like, a high level of operational skill is necessary.

An object of the present invention is to provide an imaging device capable of easily creating movie image data including a movie image having an impressive video effect.

Solution to Problem

An imaging device of the present invention comprises: an imaging sensor that captures subject light via a photographic optical system having a zoom lens and a focus lens; a display unit that displays a through image based upon an imaging signal from the imaging sensor; a predetermined area setting unit that sets a predetermined area on the through image displayed on a display surface of the display unit in a state which is set to a first angle of view or a second angle of view different from the first angle of view by driving the zoom lens; a movement control unit that moves positions of the zoom lens and the focus lens by controlling drive of the zoom lens and the focus lens, so as to change from a first state, which is set to the first angle of view and serves as an in-focus state focused on the predetermined area set by the predetermined area setting unit to a second state, which is set to the second angle of view and serves as an out-of-focus state defocused on the predetermined area, or from the second state to the first state over a predetermined time; and a movie image data creation unit that creates movie image data, which includes a movie image changed from the first state to the second state or from the second state to the first state by the movement control unit over the predetermined time, based upon the imaging signal from the imaging sensor.

Advantageous Effects of Invention

According to the imaging device of the present invention, it is possible to easily create movie image data including a movie image having an impressive video effect.

DESCRIPTION OF EMBODIMENTS

Figure 1:
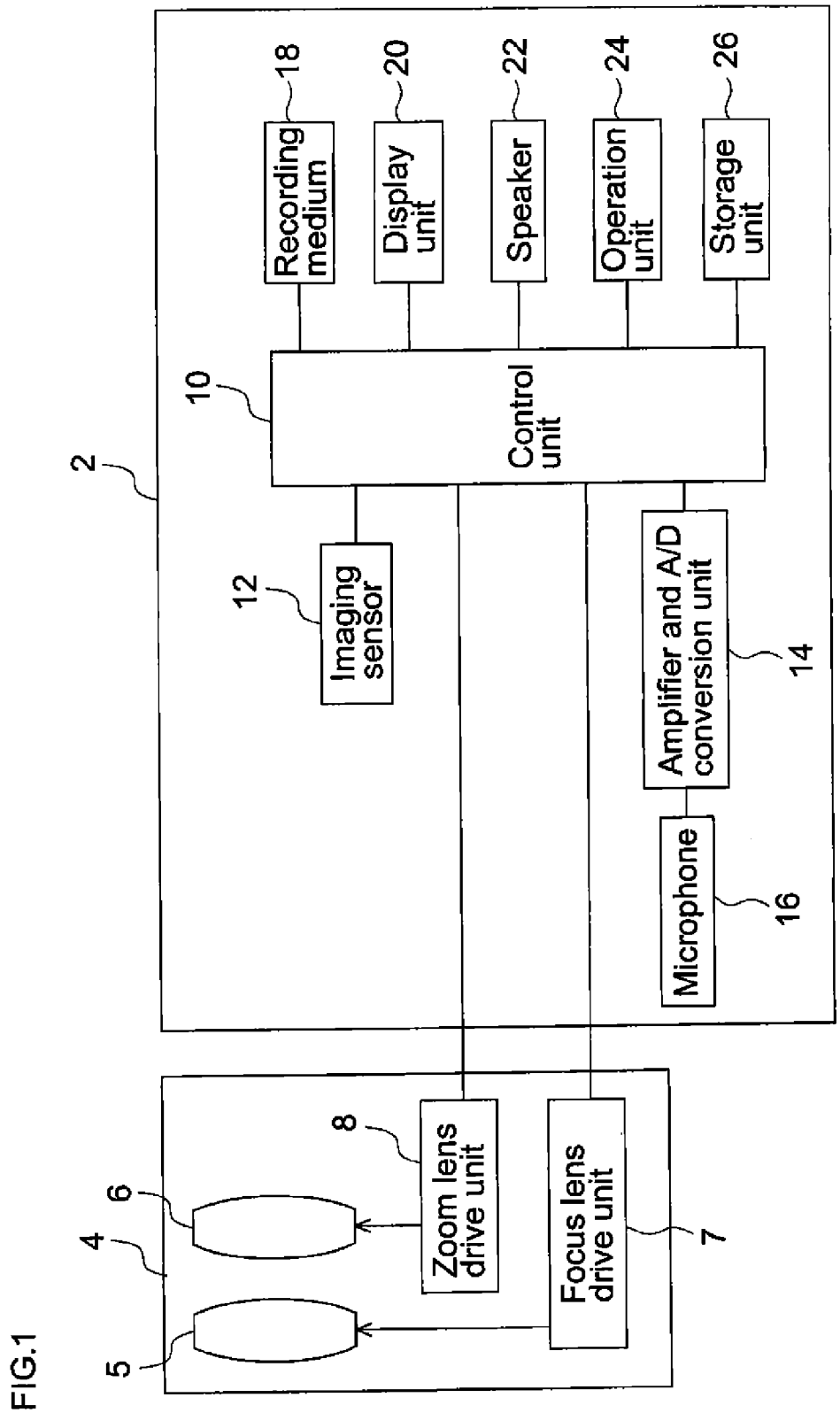
FIG. 1 is a block diagram showing the system configuration of an electronic camera according to an embodiment.

Hereinafter, with reference to the drawings, an electronic camera will be described as an imaging device according to a first embodiment of the present invention. FIG. 1 is a block diagram showing the system configuration of an electronic camera 2 according to the first embodiment. As shown in FIG. 1, the electronic camera 2 is provided with a photographic lens 4 including a focus lens 5, a zoom lens 6, a focus lens drive unit 7 for driving the focus lens 5 in an optical axis direction, a zoom lens drive unit 8 for driving the zoom lens 6 in the optical axis direction, and the like. The focus lens drive unit 7 and the zoom lens drive unit 8 drive the focus lens 5 and the zoom lens 6 under the control of the electronic camera 2 (a control unit 10 which will be described later). It is to be noted that in this embodiment, an interchangeable lens type electronic camera in which the photographic lens 4 is detachably mounted on the electronic camera 2 will be described as an example. However, an electronic camera having an integrated lens may also be employed. Moreover, in this embodiment, an electronic camera capable of shooting a still image and a movie image is given as an example, but this may be an electronic camera that is only capable of shooting a movie image.

The electronic camera 2 includes a control unit 10, which is constituted with a microprocessor and the like, for performing unified control of the various parts of the electronic camera 2. The control unit 10 is connected to an imaging sensor 12, an amplifier and A/D conversion unit 14, a recording medium 18, a display unit 20, a speaker 22, an operation unit 24, and a storage unit 26.

The imaging sensor 12 is constituted with a CCD, a CMOS and the like, captures subject light via the photographic lens 4 so as to output an imaging signal to the control unit 10. The control unit 10 converts the imaging signal, which is received from the imaging sensor 12, from an analog signal to a digital signal, and creates image data from the digital signal. A CMOS type imaging sensor may directly output the digital signal. Furthermore, the control unit 10 detects a contrast value of the created image data, and performs contrast-system auto-focusing based upon the detected contrast value. Specifically, the control unit 10 adjusts a focus position by moving the focus lens 5 in the optical axis direction via the focus lens drive unit 7.

The amplifier and A/D conversion unit 14 converts an analog signal of the audio in the vicinity of the electronic camera 2, which is collected by a microphone 16, into a digital signal, and outputs the converted digital audio signal to the control unit 10. The control unit 10 creates audio data from the digital audio signal output from the amplifier and A/D conversion unit 14. The recording medium 18 is a portable recording medium detachably provided in a card slot (not shown) arranged to the electronic camera 2, and uses a CF card, an SD card, and a smart media, for example. The recording medium 18 records the image data, the audio data, and the like created in the control unit 10.

The display unit 20 is constituted with a monitor, for example, configured by an LCD or an EVF, for example, configured by an LCD provided on the rear surface of the electronic camera 2. The display unit 20 displays a through image based upon the imaging signal from the imaging sensor 12, a still image and a movie image based upon the image data recorded on the recording medium 18, a sample movie image stored in a memory (not shown) in the electronic camera 2 as sample movie image data for each scenario movie image shooting mode which will be described later, information regarding shooting and the like. The speaker 22 outputs audio based upon the audio data recorded on the recording medium 18, or based upon audio data recorded in a memory (not shown) in association with the sample movie image data stored in the memory (not shown) in the above-described camera.

The operation unit 24 includes a power switch for turning on/off the power of the electronic camera 2, a recording start button (for example, a REC button and a shutter button) operated when starting to record a movie image and audio, a recording end button (for example, a REC button, and a shutter button) operated when completing recording the movie image and audio, a menu button for displaying a menu and the like on the display unit 20, a cross key operated at the time of the selection of menu items and the like and at the time of various settings, and a decision button (an OK button) for performing a determination operation for the selection of the menu items and the like and the various settings. The storage unit 26 stores a position and the like of a focus point and the like (which will be described later) relative to a display surface, which is set for the through image displayed on the display surface of the display unit 20.

In the electronic camera 2 according to this embodiment, the drive of the focus lens 5 and the zoom lens 6 is controlled by the control unit 10, so that a movie image gradually changing from a zoomed-in out-of-focus state to a state focused on a target subject while zooming-out can be automatically shot. Hereinafter, with reference to a flowchart shown in FIG. 2, description is given of the processing when the above-described movie image is shot in the electronic camera 2 according to the first embodiment.

Figure 3:
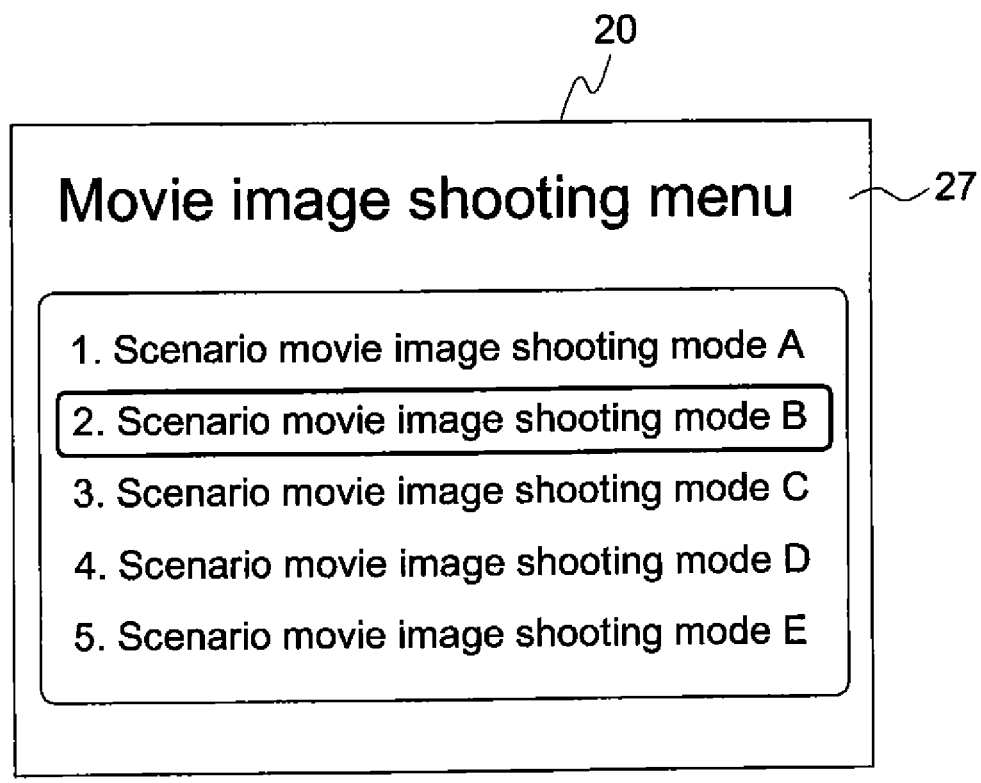
FIG. 3 is a diagram showing a display example of a display unit according to the embodiment.
Figure 4:
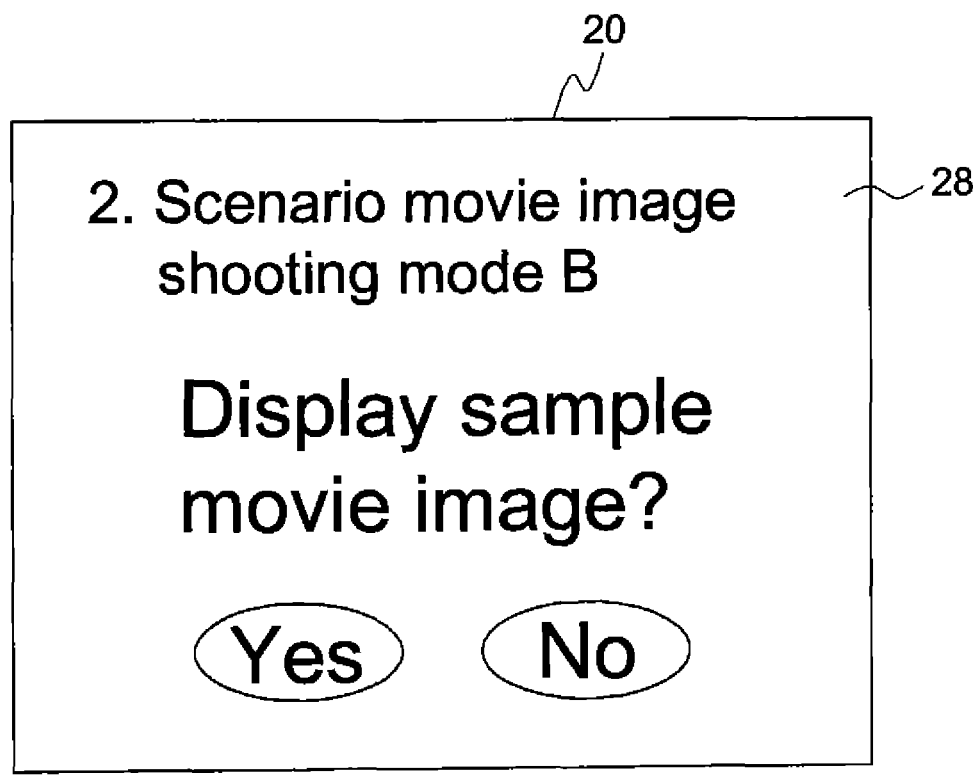
FIG. 4 is a diagram showing a display example of the display unit according to the embodiment.

First, if a user gives an instruction for displaying a movie image shooting menu (e.g., pressing of a menu button), the control unit 10 displays a movie image shooting menu screen 27, for example as shown in FIG. 3, on the display unit 20 (step S10). Items that allow for selecting various movie image shooting modes (in FIG. 3, scenario movie image shooting modes A, B, C, D, and E) are displayed on the movie image shooting menu screen 27. If a user selects one movie image shooting mode (the scenario movie image shooting mode B in FIG. 3) using the cross key and the like and presses the OK button, the control unit 10 displays a screen 28, for example as shown in FIG. 4, on the display unit 20. A message such as "Display sample movie image?" and items serving to select an answer to the message (in FIG. 4, "Yes" and "No") are displayed on the screen 28.

It is to be noted that in this embodiment, in the scenario movie image shooting mode B, a movie image reproduced while a focus state and a zoom state continuously change is shot. Furthermore, the sample movie image is a movie image, which is created in advance for each scenario movie image shooting mode, which serves to accurately present to the user the characteristic video effect for each of these scenario movie image shooting modes, and which is stored in a memory (not shown) in the electronic camera 2; by way of viewing the sample movie image, the user can easily understand the format (mode) of the movie image that can be shot with the selected scenario movie image shooting mode.

Figure 5:
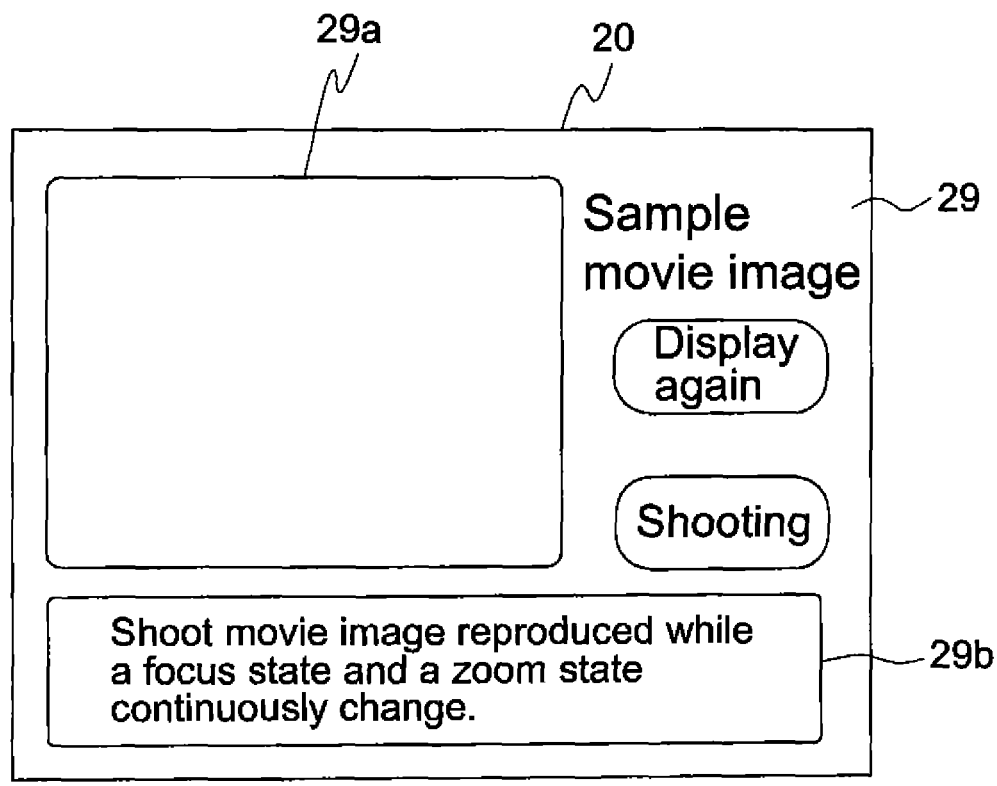
FIG. 5 is a diagram showing a display example of the display unit according to the embodiment.

If the user uses the cross key or the like to select "Yes" and presses the OK button (Yes in step S11), the control unit 10 displays a screen 29 on the display unit 20, for example as shown in FIG. 5, for the purpose of displaying the sample movie image (the display switches from FIG. 4 to FIG. 5). A sample movie image display area 29a for displaying the sample movie image, a message display area 29b in which simple descriptive text (in FIG. 5, "The movie image reproduced While a focus state and in a zoom state continuously change is shot.") is displayed in order to describe the selected scenario movie image shooting mode B, and icons for selecting displaying the sample movie image again or moving to movie image shooting (in FIG. 5, "Display Again" and "Shooting") are respectively displayed on the screen 29. Next, the control unit 10 displays a sample movie image for the scenario movie image shooting mode B in the sample movie image display area 29a (step S12).

It is to be noted that the scenario movie image shooting mode includes not only the mode for shooting a movie image in the manner set forth in the descriptive text in FIG. 5, but also movie image shooting modes (other scenario movie image shooting modes A and C through E) in which the movie image is reproduced and displayed according to scenarios different from each other in each mode and which provide various video effects, e.g., a mode for shooting a movie image while successively switching focus among subjects at different shooting distances within the screen and a mode for shooting a movie image that is reproduced slowly when a moving subject approaches.

If the user selects "Display Again," using the cross key or the like, and presses the OK button (Yes in step S13), the control unit 10 once again displays the sample movie image corresponding to the scenario movie image shooting mode B in the sample movie image display area 29a on the screen 29 shown in FIG. 5 (step S12). Meanwhile, if the user selects "No" on the screen 28 shown in FIG. 4 (No in step S11), or if the user selects "Shooting" on the screen 29 shown in FIG. 5 (No in step S13), the control unit 10 moves to shooting the movie image with scenario movie image shooting mode B, i.e., moves to setting for shooting a movie image which is reproduced while a focus state and a zoom state continuously change (step S14).

Figure 6:
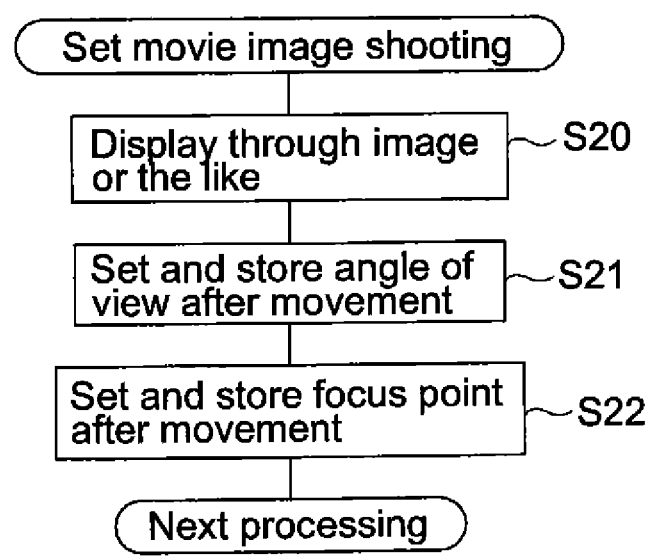
FIG. 6 is a flowchart explaining processing when setting for shooting a movie image in the electronic camera according to a first embodiment.

FIG. 6 is a flowchart explaining the processing when setting for shooting a movie image in the scenario movie image shooting mode B.

Figure 7:
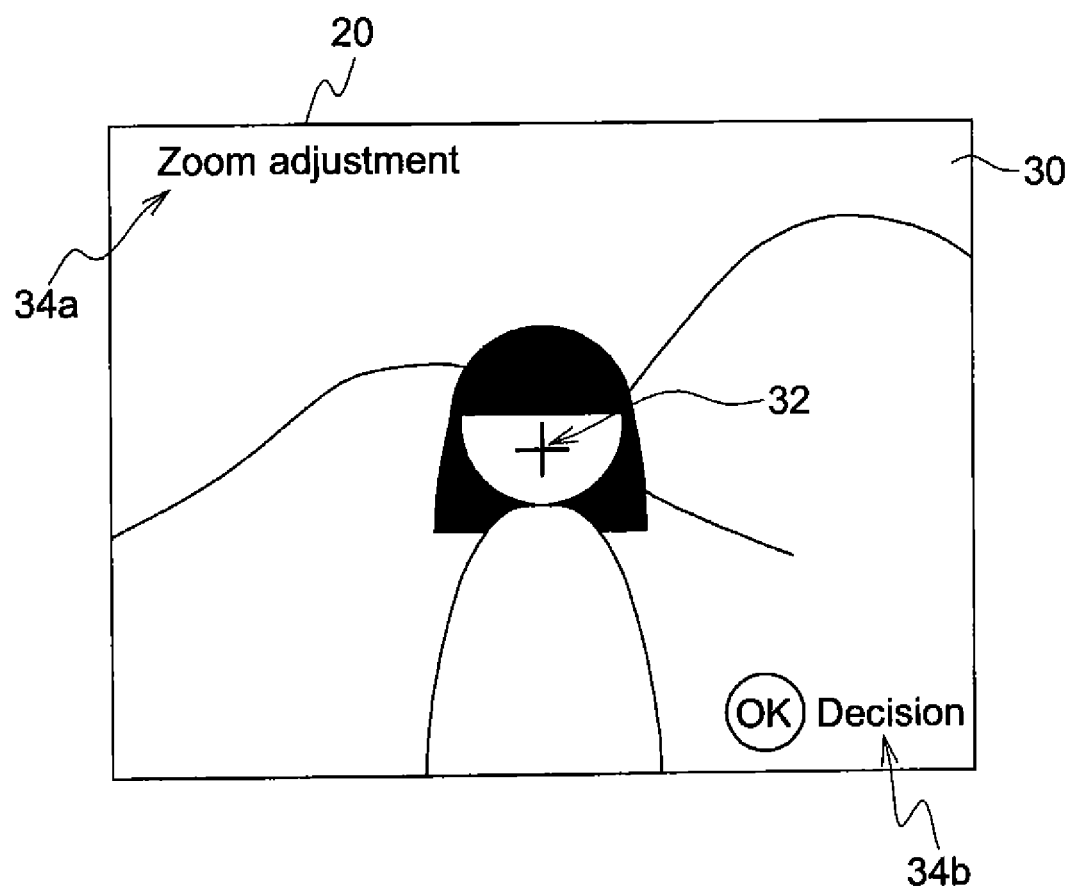
FIG. 7 is a diagram showing a display example of the display unit according to the embodiment.

First, as shown in FIG. 7, the control unit 10 displays a through image 30 on the display surface of the display unit 20, a mark (a cross mark in FIG. 7) 32 for setting the focus point after the movement of the focus (of a finally focused target), a message ("Zoom adjustment" in FIG. 7) 34a for encouraging a user to set an angle of view after movement (a zoomed-out state, hereinafter, referred to as a first angle of view) at the upper portion of the display surface, and a message 34b and the like at the right lower portion of the display surface, which indicate the pressing of the OK button by a user after the setting of the first angle of view is completed (step S20). The control unit 10 changes the angle of view by driving the zoom lens 6 via the zoom lens drive unit 8 according to an operation instruction of a user via the operation unit 24. Then, when the first angle of view (the zoomed-out state) is decided and the OK button is pressed by a user, the control unit 10 sets the first angle of view based upon the position of the zoom lens 6 and stores the first angle of view in the storage unit 26 (step S21).

Figure 8:
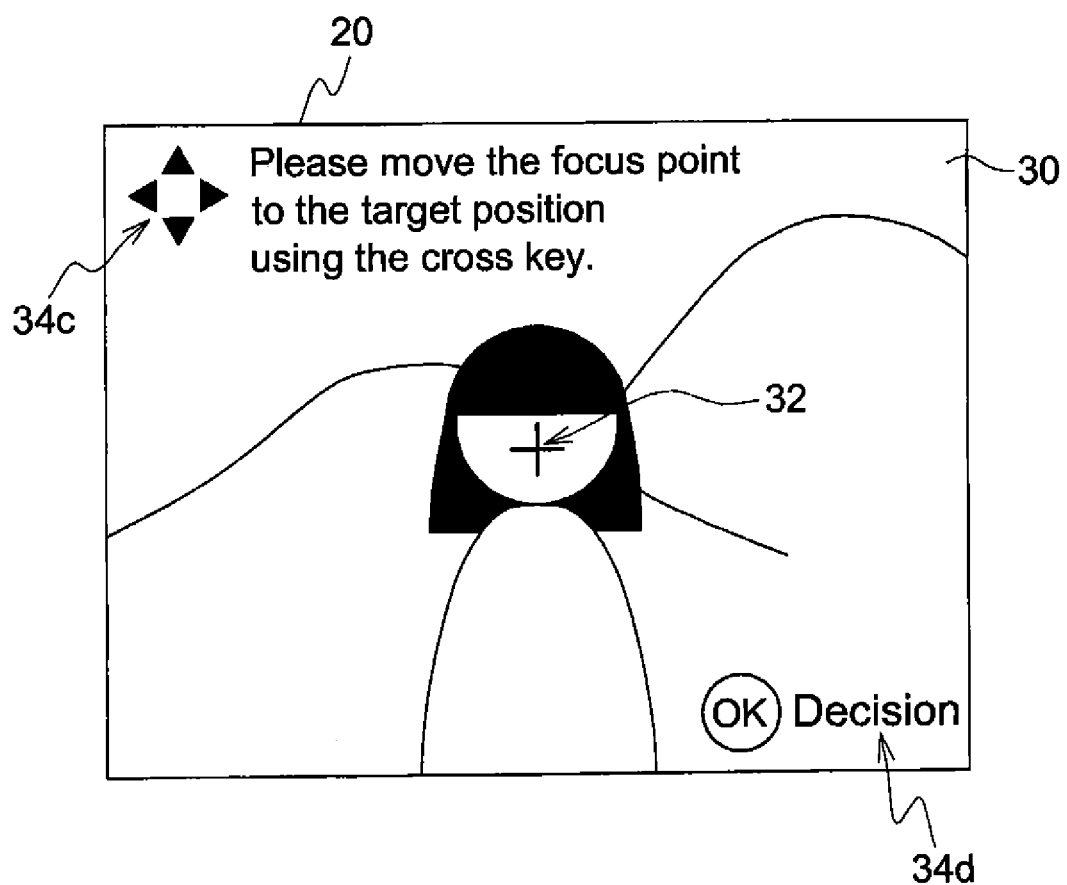
FIG. 8 is a diagram showing a display example of the display unit according to the embodiment.

Next, as shown in FIG. 8, the control unit 10 displays the through image 30 on the display surface of the display unit 20, the mark 32, a message ("Please move the focus point to the target position using the cross key" in FIG. 8) 34c for encouraging a user to set the focus point at the upper portion of the display surface, a message 34d at the right lower portion of the display surface, which indicates the pressing of the OK button by a user after the setting of the focus point is completed, and the like. In this embodiment, a user sets the position (the face of a person) of the mark 32 shown in FIGS. 7 and 8 as the focus point after movement by using the cross key and the like. It is to be noted that instead of the mark 32, a focus point area can be set using a designation frame and the like. Then, when the focus point (the mark 32) is decided and the OK button is pressed by a user, the control unit 10 sets the position of the mark 32 as the focus point after the movement and stores the position of the mark 32 in the storage unit 26 (step S22). At this time, for example, it may also be possible to display a message such as "Zoom and focus positions were stored" at the upper portion and the like of the display surface of the display unit 20.

It is to be noted that when a user moves the mark 32 using the cross key, the control unit 10 drives the focus lens 5 via the focus lens drive unit 7 with the movement of the mark 32 so as to always focus the subject indicated by the mark 32, thereby moving the focus position. Moreover, the focus lens 5 may not be moved while the mark 32 is moved by a user, and moved after the mark 32 is decided and the OK button is pressed by a user so as to focus the subject indicated by the mark 32.

Figure 2:
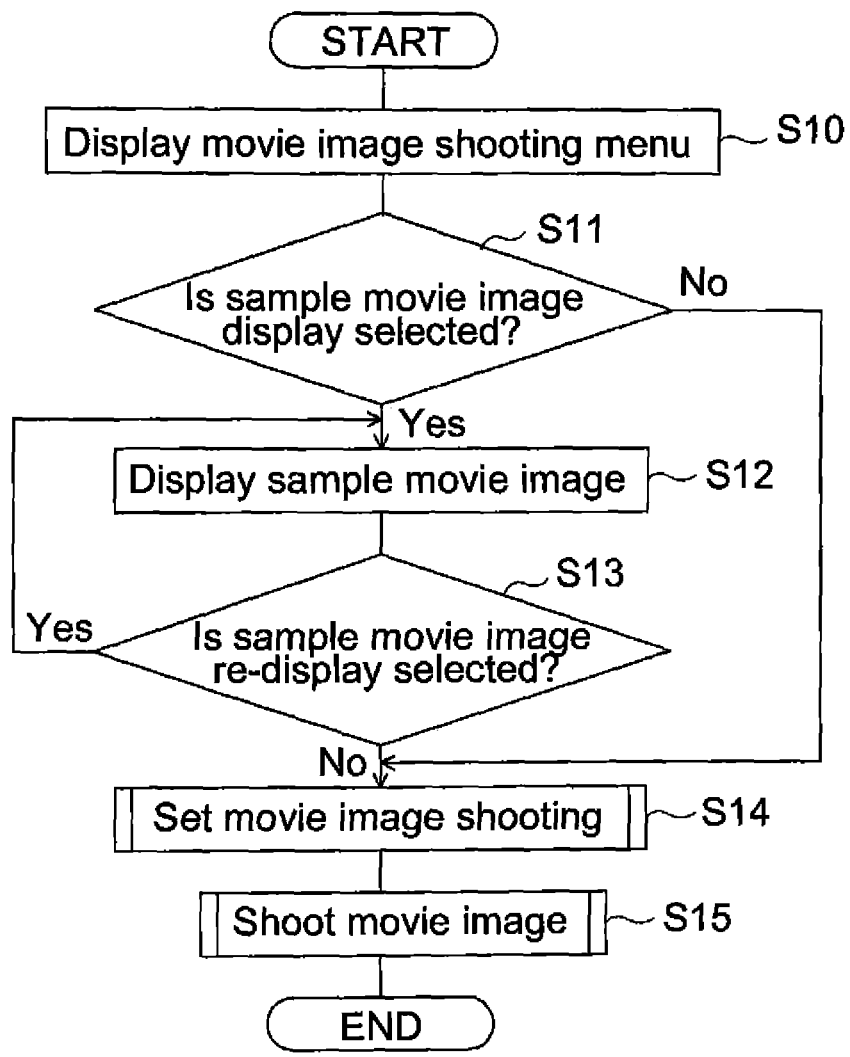
FIG. 2 is a flowchart explaining processing when shooting a movie image in the electronic camera according to the embodiment.
Figure 9:
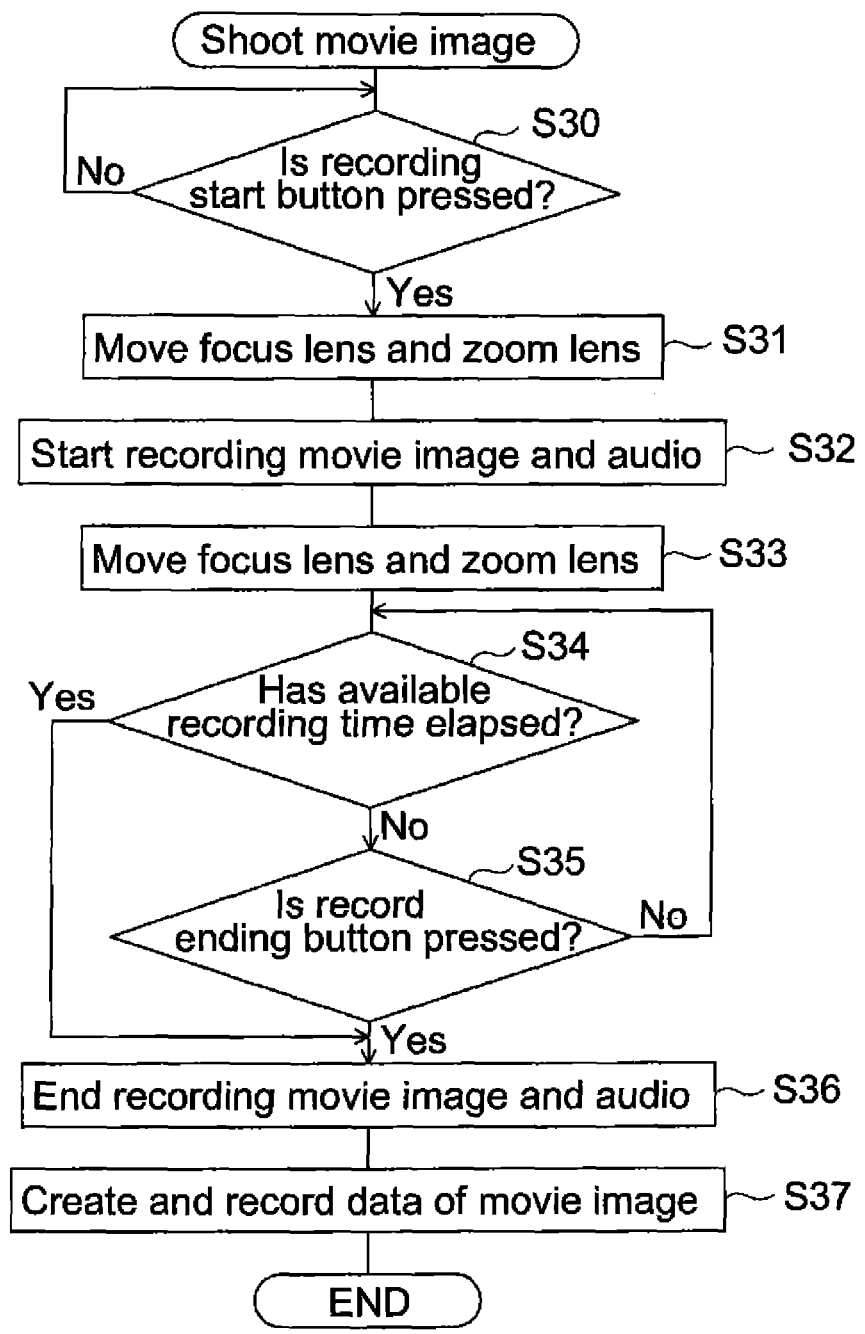
FIG. 9 is a flowchart explaining processing when shooting the movie image in the electronic camera according to the embodiment.

After completing the setting for the movie image shooting, the control unit 10 proceeds to the shooting of a movie image (step S15 of FIG. 2). FIG. 9 is a flowchart explaining the processing when shooting the movie image in the scenario movie image shooting mode B.

First, the control unit 10 determines whether or not the user has pressed the recording start button (in this embodiment, the REC button) (step S30). At this time, it is also possible to display a message and the like at the right lower portion of the display surface of the display unit 20, which indicates the pressing of the recording start button (the REC button in this embodiment) by a user when starting to record the movie image.

When it is determined that the recording start button has been pressed in step S30 (Yes in step S30), before starting to record the movie image and audio, the control unit 10 moves the focus lens 5 and the zoom lens 6 in order to achieve a transition from an in-focus state (hereinafter, referred to as a first state), which is set to the first angle of view stored in step S21 of FIG. 6 and focused on the subject indicated by the focus point (the mark 32) stored in step S22, to an out-of-focus state (hereinafter, referred to as a second state), which is set to the angle of view (zoomed-in state, hereinafter, referred to as a second angle of view) before movement and not focused on the subject indicated by the focus point (the mark 32) stored in step S22 (step S31).

Figure 10:
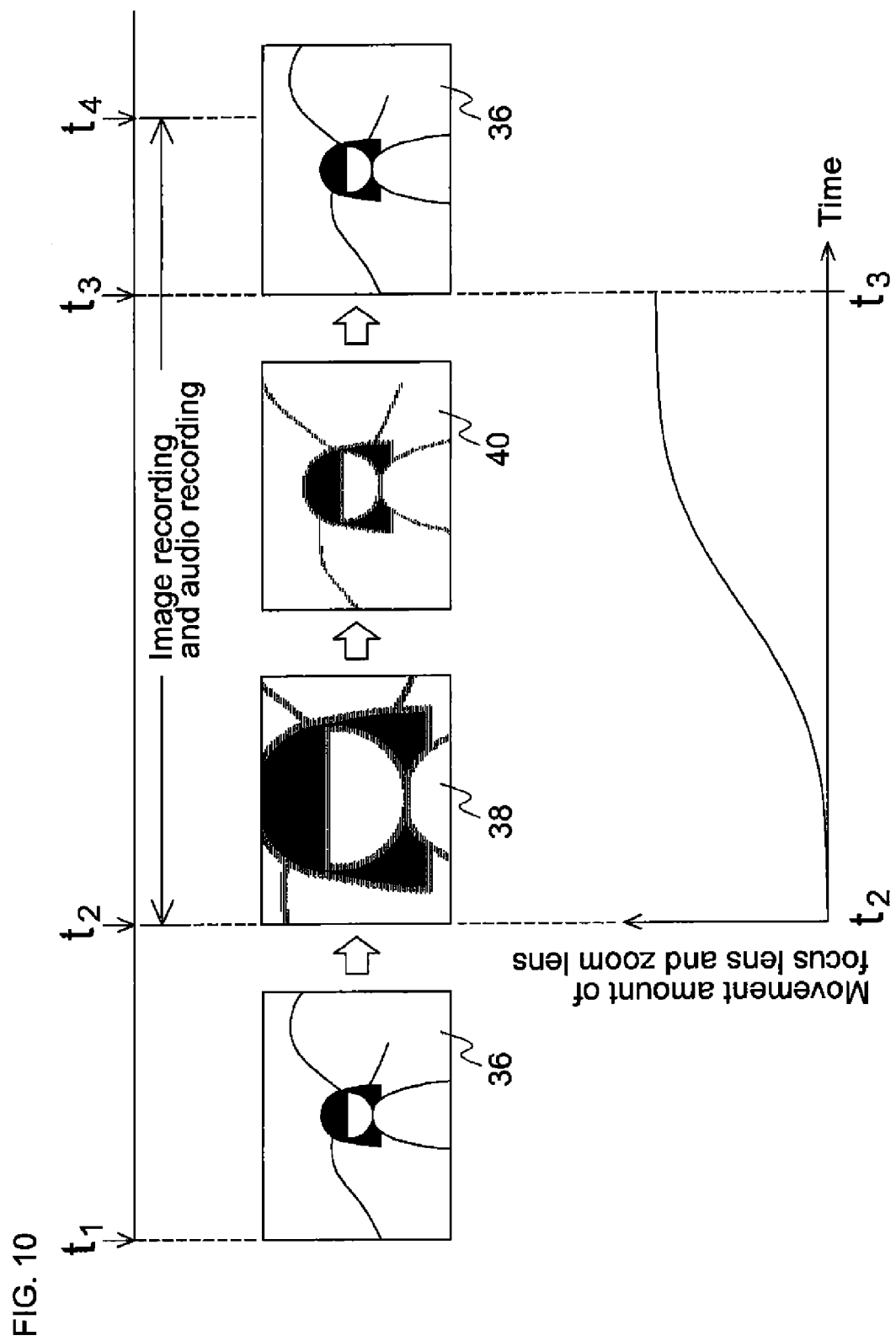
FIG. 10 is a time chart showing from a start of recording a movie image to an end.

For example, as shown in FIG. 10, when the recording start button has been pressed at time t1, the control unit 10 moves the focus lens 5 and the zoom lens 6 such that the through image displayed on the display unit 20 is changed from an image 36 when being set to the first state to an image 38 when being set to the second state. The focus lens 5 is moved, so that the subject indicated by the mark 32 in FIGS. 7 and 8 is in the out-of-focus state from the in-focus state. The zoom lens 6 is moved, so that the subject is set to the second angle of view (zoomed-in state) from the first angle of view stored in step S21.

It is to be noted that the out-of-focus degree in the second state of the subject indicated by the mark 32 in FIGS. 7 and 8, that is, the degree of blurring is set in advance and stored in a memory (not shown) and the like. The control unit 10 moves the focus lens 5 such that the degree of blurring of the subject in the second state is equal to the degree of blurring set in advance.

Furthermore, the second angle of view relative to the first angle of view is set in advance and stored in a memory (not shown) and the like. In this embodiment, the first angle of view is larger than the second angle of view and set to be twice as large as the second angle of view. The control unit 10 acquires lens information of the photographic lens 4 from the photographic lens 4 when the photographic lens 4 is mounted on the electronic camera 2, and determines whether the second angle of view set in advance is in the range of angle of view which can be set in the photographic lens 4 from a focal distance range included in the lens information. When the second angle of view is in the range of angle of view, the control unit 10 moves the zoom lens 6 such that the angle of view in the second state is equal to the second angle of view set in advance. Meanwhile, when the second angle of view is not in the range of angle of view, the control unit 10 moves the zoom lens 6 such that the angle of view in the second state is equal to the maximum angle of view which can be set in the photographic lens 4.

In addition, the second angle of view may also be decided based upon the first angle of view set in step S21 of FIG. 6 and a permissible range of angle of view on the basis of the focal distance range of the photographic lens 4. Moreover, the range of the first angle of view, which can be set in step S21 of FIG. 6, may also be limited based upon the permissible range of angle of view based upon the focal distance range of the photographic lens 4.

After being set to the second state through the movement of the focus lens 5 and the zoom lens 6 in step S31 (time t2 in FIG. 10), the control unit 10 starts to record the movie image and audio (step S32). Then, the control unit 10 moves the focus lens 5 and the zoom lens 6 over a predetermined time so as to achieve a transition to the first state from the second state (step S33). That is, as shown in FIG. 10, the control unit 10 moves the focus lens 5 and the zoom lens 6 over a predetermined time (t3-t2) such that the image is gradually changed to the image 36 when being set to the first state from the image 38 when being set to the second state. It is to be noted that the image 40 is an image in the processing of moving the focus lens 5 and the zoom lens 6.

The predetermined time is set in advance in the range not exceeding an available recording time which will be described later and stored in a memory (not shown) and the like. In this embodiment, the predetermined time is set to six seconds. Furthermore, the focus lens 5 and the zoom lens 6 may be linearly moved or non-linearly moved like an S-shaped characteristic curve in the predetermined time. In this embodiment, the focus lens 5 and the zoom lens 6 are set to move while drawing an S-shaped curve as shown in the graph of FIG. 10.

Next, the control unit 10 determines whether the available recording time has elapsed (step S34). The available recording time is the maximum time for recording one movie image with audio, which is set in advance based upon the capacity or the like of the recording medium 18, and stored in a memory (not shown) or the like. In this embodiment, the available recording time is set to 15 seconds. When it is determined that the available recording time, that is, 15 seconds have not elapsed from time t2 in step S34 (No in step S34), the control unit 10 determines whether or not the user has pressed the recording end button (the REC button in this embodiment) (step S35). When it is determined that the recording end button has not been pressed in step S35 (No in step S35), the control unit 10 returns to the processing in step S34 and repeats the processing in steps S34 and S35.

Meanwhile, if it is determined that the available recording time has elapsed in step S34 (Yes in step S34) or if it is determined that the recording end button has been pressed in step S35 (Yes in step S35), the control unit 10 ends the recording of the movie image and audio (step S36). That is, as shown in FIG. 10, when time t4 is the time at which the available recording time elapses or the timing at which the recording end button is pressed by a user, the control unit 10 ends the recording of the movie image and the recording of the audio at time t4 in the first state, which is continued from time t3.

Then, the control unit 10 creates movie image data based upon the movie image (including the movie image gradually changed to the first state from the second state) recorded from time t2 to time t4 on the basis of the imaging signal from the imaging sensor 12, and creates audio data based upon the audio from time t2 to time t4 on the basis of the digital audio signal from the microphone 16 via the amplifier and A/D conversion unit 14 (step S37). Then, the control unit 10 records the created movie image data and audio data on the recording medium 18 (step S37). At this time, prior to recording the movie image data and audio data on the recording medium 18, a message confirming recording to the recording medium 18 such as (e.g., "OK to record?"), and an icon (e.g., "Yes or No") for selecting whether or not record to the recording medium 18 may be displayed.

In the electronic camera 2 according to the first embodiment, it is possible to easily create the movie image in a focus state and in a zoom state which continuously change. According to the conventional technology, when manually shooting the above-described movie image, a focus lens and a zoom lens need to be moved at the same time and a high level of operational skill is required. However, in the electronic camera 2 according to this embodiment, a focus lens and a zoom lens can be automatically moved at the same time, so that it is possible to easily create a movie image in a focus state and in a zoom state which continuously change, that is, a movie image having an impressive video effect even without a high level of operational skill.

It is to be noted that in the first embodiment, the degree of blurring (the second state and the position of the focus lens 5) and the second angle of view (the position of the zoom lens 6) are set in advance. However, the preset degree of blurring (the second state) and second angle of view can be used as a default, and the degree of blurring (the second state) and the second angle of view can be configured to be changed. In such a case, for example, after the processing of the step S22 of FIG. 6 is performed, the degree of blurring (the second state) and the second angle of view are set.

Figure 11:
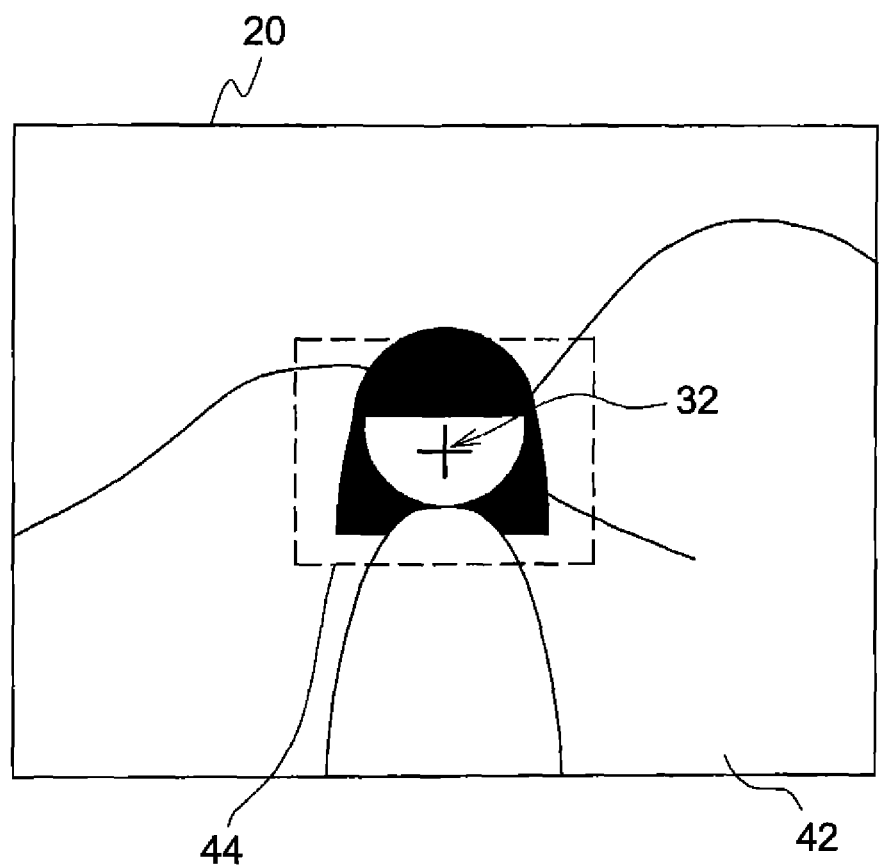
FIG. 11 is a diagram showing a display example of the display unit according to the embodiment.

In detail, for example, a screen (a through image displayed in the state set to the first angle of view) 42 as shown in FIG. 11 and a designation frame 44 for setting the second angle of view are displayed on the display unit 20. A user sets the second angle of view, that is, the size of the screen before movement by changing the size of the designation frame 44 using the cross key and the like. It is necessary that the designation frame 44 has a shape similar to that of the display surface of the display unit 20, and a center coinciding with that of the display surface of the display unit 20. Furthermore, the range of the size of the designation frame 44, that is, a settable range of the second angle of view is decided based upon the focal distance range of the photographic lens 4. It is to be noted that instead that the second angle of view is set using the designation frame 44 on the screen (the through image displayed on the display surface of the display unit 20 in the state set to the first angle of view) 42, the second angle of view may also be set by actually moving the zoom lens 6.

After the second angle of view is set (e.g., after the size of the designation frame 44 is set and the OK button is pressed by a user), the degree of blurring (the second state) is set. Specifically, a screen set to the second angle of view is displayed on the display surface of the display unit 20. The control unit 10 gradually defocuses the subject, which is indicated by the focus point set in step S21 of FIG. 6, by driving the focus lens 5 according to an operation instruction of a user via the cross key and the like. A user decides the degree of blurring while checking the image displayed on the display unit 20, and then presses the OK button. When it is determined that the OK button has been pressed by a user, the control unit 10 sets the degree of blurring at that time, that is, the position of the focus lens 5, as the out-of-focus degree in the second state. After setting the second angle of view and the degree of blurring in the second state, that is, when the focus lens 5 and the zoom lens 6 are located at the positions in the second state, the control unit 10 determines whether the recording start button has been pressed by a user. When it is determined that the recording start button has been pressed, since the focus lens 5 and the zoom lens 6 are already located at the positions in the second state, the control unit 10 immediately starts to record a movie image and audio and starts the movement of the focus lens 5 and the zoom lens 6.

It is to be noted that when the first angle of view, the second angle of view, the focus point, and the out-of-focus degree are settable, the second angle of view and the out-of-focus degree may be set after the first angle of view and the focus point are set as described above. However, the first angle of view and the focus point may also be set after the second angle of view and the out-of-focus degree are set.

Hereinafter, with reference to the drawings, an electronic camera according to a second embodiment of the present invention will be described. Since the electronic camera according to the second embodiment has the same configuration as that of the electronic camera 2 according to the first embodiment, detailed description thereof will be omitted and description is made using the identical reference numerals for the configurations that are identical to the configurations.

According to the second embodiment, when a person exists as a subject on a through image (an image in the state set to the first angle of view) displayed on the display surface of the display unit 20, the control unit 10 detects the face area of the person in the image based upon the imaging signal from the imaging sensor 12. The face area is detected using a well-known technology such as detection of a color (a flesh color), detection of a feature part forming a face of eyes, nose, mouth and the like or detection of the outline of a face. The control unit 10 sets the second angle of view based upon the detection result of the face area in the image.

Furthermore, the control unit 10 extracts the high frequency component of an image (an image set to the first state) based upon the imaging signal from the imaging sensor 12. The extraction of the high frequency component is performed by a well-known technology using a high-pass filter and the like provided in an image processing unit (not shown) of the control unit 10. The control unit 10 sets the out-of-focus degree in the second state based upon the extraction result of the high frequency component in the image.

Figure 12:
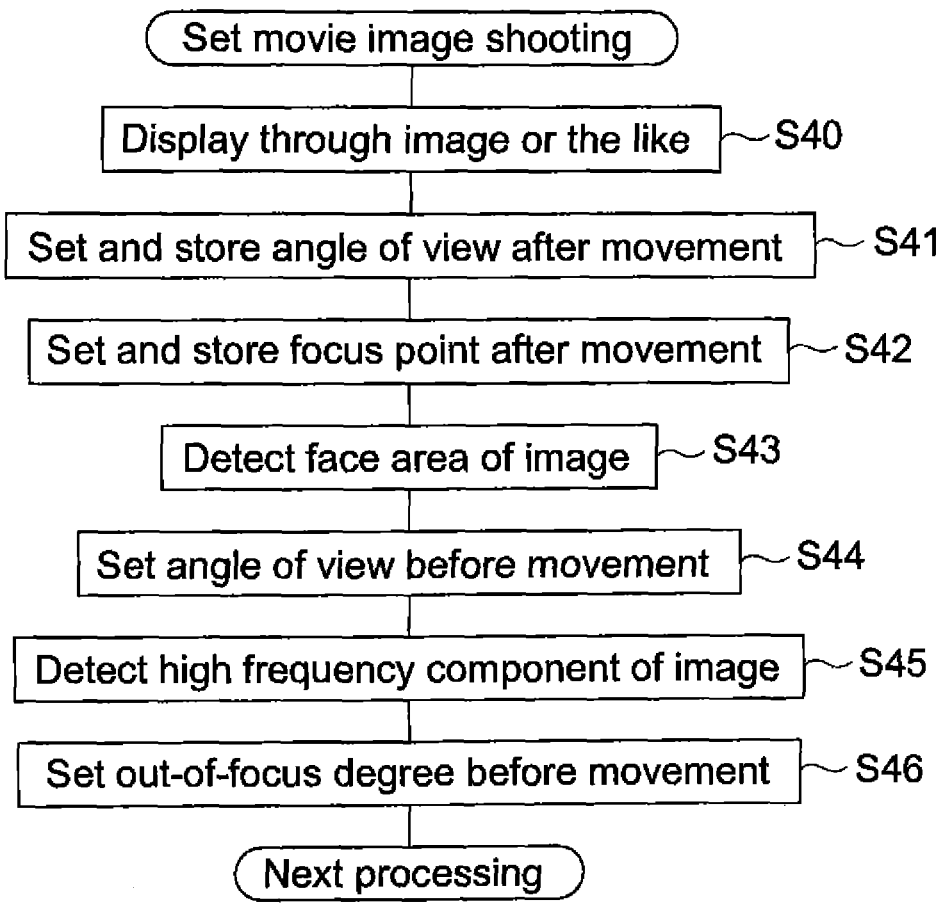
FIG. 12 is a flowchart explaining processing when setting for shooting a movie image in the electronic camera according to a second embodiment.

That is, after completing the processing in steps S10 to S13 shown in FIG. 2, the control unit 10 proceeds to the setting for shooting the movie image according to the second embodiment (step S14). FIG. 12 is a flowchart explaining the processing when setting for shooting the movie image in the scenario movie image shooting mode B by using the electronic camera according to the second embodiment. It is to be noted that since the processing in steps S40 to S42 are substantially identical to the processing in steps S20 to S22 shown in FIG. 6, detailed description thereof will be omitted.

Next, the control unit 10 detects the face area of the image (the image set to the first state) based upon the imaging signal from the imaging sensor 12 (step S43). That is, the control unit 10 detects the size of the face area with respect to a shooting screen (the size of the through image displayed on the display surface of the display unit 20) and sets an angle of view (the second angle of view) before movement based upon the detection result (step S44). In detail, the control unit 10 sets the second angle of view such that the size of the face area with respect to the shooting screen is equal to a predetermined size. That is, the movement amount of the zoom lens 6 is set and decided based upon the difference between the size of the face area detected in step S43 and the predetermined size (e.g., decided in proportion to the difference). It is to be noted that the predetermined size is set in advance and stored in a memory (not shown) and the like.

Then, the control unit 10 extracts the high frequency component of the image (the image set to the first state) based upon the imaging signal from the imaging sensor 12 (step S45). It is to be noted that the high frequency component of the focus point area after movement may also be extracted instead of the high frequency component of the entire image. Next, the control unit 10 sets the out-of-focus degree (the degree of blurring) in the second state based upon the high frequency component detected in step S45 (step S46). In detail, the control unit 10 sets the out-of-focus degree (the degree of blurring) in the second state such that the high frequency component of the image is equal to or less than a predetermined amount. That is, the movement amount of the focus lens 5 is set and decided based upon the difference between the high frequency component detected in step S45 and the predetermined amount (e.g., decided in proportion to the difference). It is to be noted the predetermined amount is set in advance and stored in a memory (not shown) and the like.

After completing the setting for the movie image shooting, the control unit 10 proceeds to the shooting of the movie image (step S15 of FIG. 2). Since the processing for shooting the movie image in the electronic camera according to the second embodiment are substantially identical to the processing (refer to FIG. 9) for shooting the movie image in the electronic camera 2 according to the first embodiment, detailed description thereof will be omitted.

In the electronic camera according to the second embodiment, in addition to the effects of the electronic camera 2 according to the first embodiment, the second angle of view and the out-of-focus degree can be automatically set based upon the detection result of the face area and the extraction result of the high frequency component. Consequently, a movie image in which a focus state and a zoom state continuously change, that is, a movie image having an impressive video effect can be created more simply with high accuracy.

It is to be noted that in the second embodiment, only the second angle of view is set based upon the detection result of the face area of the image set to the first state. However, the first angle of view and the second angle of view can also be set based upon the detection result of the face area. Similarly to the second angle of view, the first angle of view is set such that the size of the face area with respect to the shooting screen is equal to a size (different from the above-described predetermined size) which is set in advance for setting the first angle of view. In such a case, since the electronic camera 2 automatically sets the first angle of view and the second angle of view, a user can shoot a movie image according to the present invention more simply without setting the first angle of view and the second angle of view. Moreover, only the first angle of view may also be configured to be set based upon the detection result of the face area.

It is to be noted that according to each of the above-described embodiments, a movie image changing from a zoomed-in out-of-focus state to a state focused on a target subject while zooming-out is shot. However, it is also possible to shoot a movie image changing from a zoomed-out out-of-focus state to a state focused on a target subject while zooming-in, a movie image changing from an in-focus state with respect to a zoomed-in predetermined subject to an out-of-focus state with respect to a predetermined subject while zooming-out, or a movie image changing from an in-focus state with respect to a zoomed-out predetermined subject to an out-of-focus state with respect to a predetermined subject while zooming-in, by using the technology according to the present invention. Furthermore, it is also possible to shoot a movie image changing from a zoomed-in state to a zoomed-out state or from a zoomed-out state to a zoomed-in state while maintaining an in-focus state with respect to a target subject. In such cases, an angle of view before and after movement, a focus point and the out-of-focus degree are set similarly to each of the above-described embodiments.

Moreover, according to each of the above-described embodiments, the predetermined time, which is the time required for changing from the first state to the second state (or from the second state to the first state), is set in advance. However, the predetermined time set in advance can be used as a default and the predetermined time can be configured to be changed. In such a case, an item for setting the predetermined time is added to a menu item in a menu, and a menu screen is displayed on the display unit 20 and operated using the cross key and the like in order to shoot a movie image, so that the predetermined time is set. Furthermore, in the case where a user sets the first angle of view or the second angle of view on the display surface of the display unit 20, when the focus point or the out-of-focus degree is set, the predetermined time (for example, "5 seconds") is displayed at the right lower portion and the like of the display surface of the display unit 20 and operated by a user using the cross key and the like, so that the predetermined time can also be set.

In addition, according to each of the above-described embodiments, as shown in the graph of FIG. 10, the focus lens 5 and the zoom lens 6 are set in advance to be non-linearly moved. However, this may be used as a default, and whether the focus lens 5 and the zoom lens 6 linearly change or non-linearly change may also be configured to be selected. In such a case, an item for selecting a linear change or a non-linear change is added to a menu item in a menu, and a menu screen is displayed on the display unit 20 and operated using the cross key and the like before a movie image is recorded, so that the linear change or the non-linear change is selected.

Furthermore, according to each of the above-described embodiments, as shown in the graph of FIG. 10, both the focus lens 5 and the zoom lens 6 are moved while drawing an S-shaped curve. However, for example, the focus lens 5 and the zoom lens 6 may also be moved while drawing different curves or straight lines, respectively, such as the linear movement of the focus lens 5 and the non-linear movement of the zoom lens 6.

In addition, according to each of the above-described embodiments, the available recording time is set in advance and image recording is not possible when the available recording time passes. However, image recording and audio recording can be configured to be continued until the recording end button is pressed by a user. Moreover, the preset available recording time can be used as a default and the available recording time can be configured to be changed.

Moreover, according to each of the above-described embodiments, an angle of view, a focus point and the like are set using the cross key or the OK button. However, the electronic camera 2 includes: a touch panel I/F; and a touch panel connected to the touch panel I/F and provided on a display screen of the display unit 20, and the angle of view, the focus point and the like may be set using this touch panel. In such a case, the control unit 10 recognizes a contact of a user's finger, a pen and the like on the touch panel (the display screen of the display unit 20) via the touch panel I/F, and performs processing based upon the recognition result.

Moreover, according to each of the above-described embodiments, the electronic camera having an auto-focus function based upon a contrast detection system as the detection method of the focus position (the auto-focus function) has been described as an example. However, the present invention is not limited thereto. For example, the present invention can be applied to an electronic camera disclosed in Japanese Unexamined Patent Application Publication No. 2009-89144, which performs an auto-focus function by using an image sensor 12 where an AF pixel for a divided-pupil phase difference detection system is embedded.

Furthermore, according to each of the above-described embodiments, the case where the photographic lens 4 including the zoom lens 6 is mounted on the electronic camera 2 has been described as an example. However, when a single focus photographic lens is mounted on the electronic camera 2, it is not possible to shoot a movie image in which a focus state and a zoom state continuously change, according to the present invention. In such a case, in any one of the processing in steps S10 to S13 shown in FIG. 2, it may be possible to display a message indicating that it is not possible to shoot a movie image in which a focus state and a zoom state continuously change, because the single focus photographic lens is mounted.

The embodiments explained above have been described so that the present invention is understood more easily, and are not intended to limit the present invention. Therefore, in this meaning, the respective elements, which are disclosed in the respective embodiments described above, also include all of modifications of design and equivalents belonging to the technical scope of the present invention.

The invention claimed is:
1. An imaging device, comprising:
an imaging sensor that captures subject light via a photographic optical system having a zoom lens and a focus lens;
a display unit that displays a through image based upon an imaging signal from the imaging sensor;
a predetermined area setting unit that sets a predetermined area on the through image displayed on a display surface of the display unit in a state which is set to a first angle of view or a second angle of view different from the first angle of view by driving the zoom lens;
a movement control unit that controls movements of the zoom lens and the focus lens so as to change from a first state, which is set to the first angle of view by the zoom lens and serves as an in-focus state focused on the predetermined area by the focus lens, to a second state, which is set to the second angle of view by the zoom lens and serves as an out-of-focus state defocused on the predetermined area by the focus lens, or from the second state to the first state over a predetermined period of time; and
a movie image data creation unit that creates movie image data, which includes a movie image changed from the first state to the second state or from the second state to the first state by the movements of the zoom lens and the focus lens controlled by the movement control unit over the predetermined period of time, based upon the imaging signal from the imaging sensor.

2. The imaging device according to claim 1, further comprising,
when the first angle of view is larger than the second angle of view and the movie image data creation unit creates the movie image data including the movie image changed from the second state to the first state over the predetermined period of time, an instruction unit that gives an instruction to create the movie image data by the movie image data creation unit, wherein
the predetermined area setting unit sets the predetermined area on the through image displayed on the display surface of the display unit to the first state, the movement control unit changes the movie image from the first state to the second state when the instruction is received from the instruction unit, and the movie image data creation unit does not start to create the movie image data while the movie image is being changed from the first state to the second state by the movement control unit according to the instruction from the instruction unit, and starts to create the movie image data after the movie image is completely changed from the first state to the second state by the movement control unit.

3. The imaging device according to claim 2, wherein the photographic optical system is configured to be detachable from the imaging device, and an angle-of-view setting unit sets the first angle of view and the second angle of view in a permissible range of angle of view based upon a focal distance range of the photographic optical system.

4. The imaging device according to claim 2, further comprising:

when a person exists as a subject on the through image displayed on the display surface of the display unit in a state which is set to at least one of the first angle of view and the second angle of view, a detection unit that detects a size of a face area of the person with respect to a size of the through image, wherein an angle-of-view setting unit sets at least one of the first angle of view and the second angle of view based upon the size of the face area which is detected by the detection unit.

5. The imaging device according to claim 1, further comprising an angle-of-view setting unit that sets the second angle of view on the through image displayed on the display surface of the display unit in the state which is set to the first angle of view, the first angle of view being larger than the second angle of view.

6. The imaging device according to claim 1, further comprising an angle-of-view setting unit that sets the first angle of view on the through image displayed on the display surface of the display unit in the state which is set to the second angle of view, the second angle of view being larger than the first angle of view.

7. The imaging device according to claim 1, wherein the predetermined period of time can be changed.

8. The imaging device according to claim 1, further comprising an out-of-focus degree setting unit that sets an out-of-focus degree in the out-of-focus state on the through image, which is displayed on the display surface of the display unit in the state set to the second angle of view, by controlling driving of the focus lens.

9. The imaging device according to claim 1, further comprising:

a high frequency component extraction unit that extracts a high frequency component of an image in the predetermined area; and an out-of-focus degree setting unit that sets an out-of-focus degree in the out-of-focus state based upon the high frequency component of the image extracted by the high frequency component extraction unit.

* * * * *